Dec. 18, 1945.   A. MUELLER   2,391,332
METHOD OF MAKING PIPE FITTINGS
Filed Oct. 11, 1943   2 Sheets-Sheet 1
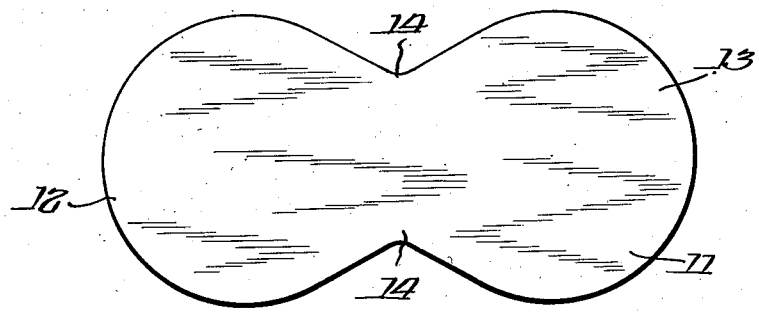
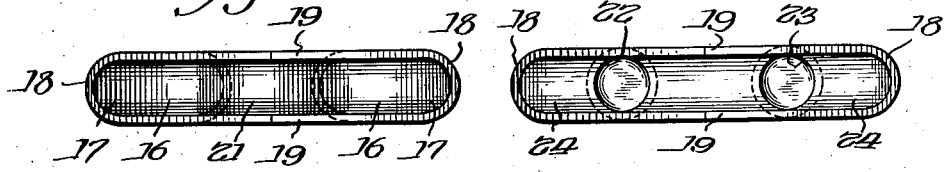
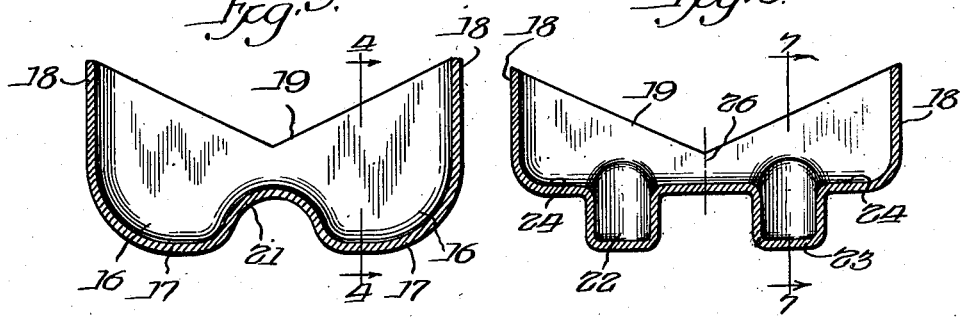
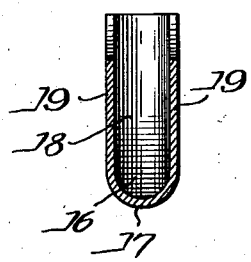
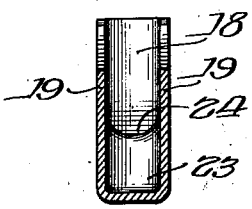
Inventor:
Alfred Mueller
By: Joseph O. Lange Atty.

Dec. 18, 1945.   A. MUELLER   2,391,332
METHOD OF MAKING PIPE FITTINGS
Filed Oct. 11, 1943   2 Sheets-Sheet 2

Inventor:
Alfred Mueller
By: Joseph O. Longe, Atty.

Patented Dec. 18, 1945

2,391,332

UNITED STATES PATENT OFFICE 2,391,332

METHOD OF MAKING PIPE FITTINGS

Alfred Mueller, Berwyn, Ill., assignor to Crane Co., Chicago, Ill., a corporation of Illinois Application October 11, 1943, Serial No. 505,883

5 Claims. (Cl. 29—157)

This invention relates to improvements in the method of making pipe fittings, and has for an object a novel and inexpensive method of manufacture by which seamless fittings are formed from sheet metal or other material by simple blanking and forming operations.

This invention further contemplates a method of manufacture wherein blanks of predetermined sizes and shapes are cut or blanked from sheet material for forming into seamless pipe fittings.

This invention further contemplates a method of manufacture whereby a plurality of seamless pipe fittings may be formed from a single blank.

The invention embodies other novel features in the method of making seamless pipe fittings which are hereinafter set forth in the specification and claims and illustrated in the accompanying drawings, forming part thereof, wherein Fig. 1 is a plan view showing the form of blank used in forming a pair of seamless pipe fittings by the method embodying my invention.

Fig. 2 is a plan view illustrating the first stage in the forming operation.

Fig. 3 is a longitudinal sectional view of the formed blank shown in Fig. 2.

Fig. 4 is a sectional view taken on the line 4—4 of Fig. 3.

Fig. 5 is a plan view illustrating the second stage in the forming operation, and prior to being cut in half for the third forming operation.

Fig. 6 is a longitudinal sectional view of the formed blank shown in Fig. 5.

Fig. 7 is a transverse sectional view taken along the line 7—7 of Fig. 6.

Figure 8:
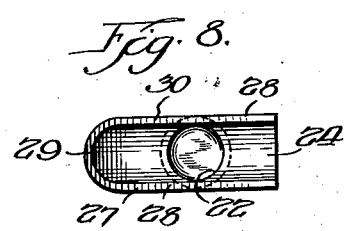
Fig. 8 is a plan view illustrating the third stage in the forming operation, and after being cut in half for the next forming operation.

Referring now to the drawings for a better understanding of my invention, I show a blank 11 which is preferably cut from flat sheet material and having a contour providing round end portions 12 and 13 and a relatively narrow neck or connecting portion 14.

In Figs. 2, 3 and 4 I have illustrated the formation assumed by the blank after the first forming operation to provide two depressions 16 defined by rounded bottoms 17, rounded end walls 18, and the side walls 19. The depressions are separated by a concave-convex wall portion 21.

Figure 9:
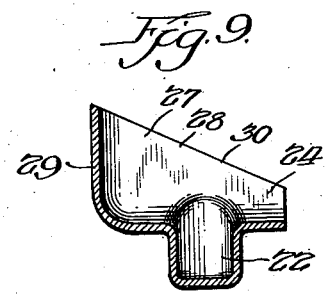
Fig. 9 is a longitudinal sectional view of the formed blank shown in Fig. 8.

Referring now to Figs. 5, 6 and 7, I have illustrated the second operation in which a pair of outlet portions 22 and 23 and the side 24 of the run portions of the fitting are formed; after which the piece is cut along the line 26 to form two similar parts of which one is shown in Figs. 8 and 9. In this form a flange portion 27 extends along the sides at 28 and around one end at 29, and the side edges 30 slope down at an angle from the end 29 to the opposite end.

Figure 10:
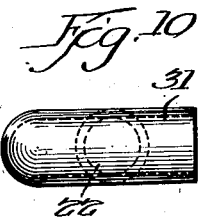
Fig. 10 is a plan view illustrating the last stage in the forming operation and prior to having the closed ends cut off to form the through passages of the T fitting.
Figure 12:
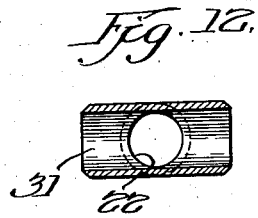
Fig. 12 is a horizontal sectional view showing a finished fitting in the form of a T.
Figure 11:
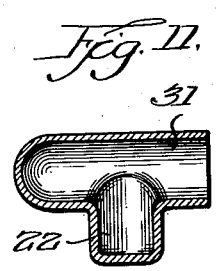
Fig. 11 is a longitudinal sectional view of the formed blank shown in Fig. 10.
Figure 13:
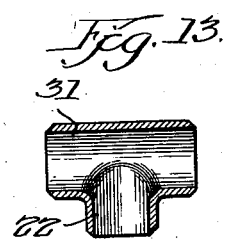
Fig. 13 is a longitudinal sectional view showing the finished seamless pipe fitting in Fig. 12.
Figure 14:
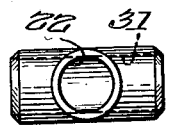
Fig. 14 is a bottom view of the fitting shown in Fig. 13.
Figure 17:
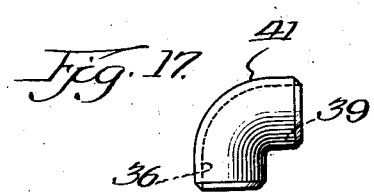
Fig. 17 is a side elevational view showing a finished seamless elbow fitting.
Figure 18:
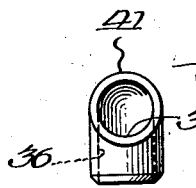
Fig. 18 is an end view of the fitting shown in Fig. 17.

Referring now to Figs. 10 and 11, I show the final forming operation in which the flange portion 27 is utilized to complete the formation of the run portion 31. The ends of the run portion and outlet portion are then finished to the form shown in Figs. 12, 13 and 14.

Figure 15:
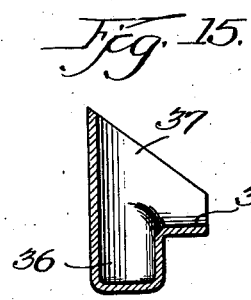
Fig. 15 is a view illustrating the manner in which blanks are formed in the manufacture of seamless elbow fittings.
Figure 16:
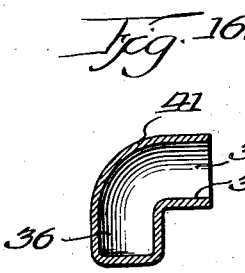
Fig. 16 illustrates a further step in shaping the formed blank shown in Fig. 15.

Figs. 15, 16, 17 and 18 illustrate a modified form of my invention in which a blank is formed to the shape shown in Fig. 15. The blank is first formed to provide an outlet portion 36, a flange portion 37, and one side 38 of the other outlet portion 39. In the final forming operation the flange portion 37 is pressed to assume the position indicated in Fig. 16 as at 41 to form the other outlet portion 39. The ends of the outlet portions 36 and 39 are then finished to complete the manufacture of the seamless elbow pipe fitting illustrated in Figs. 17 and 18. A blank similar to that shown in Fig. 1 may be employed to form two elbows by following the procedure heretofore set forth in the description of Figs. 2 to 7 applying to the T fitting.

While I have shown my invention in but two forms it is obvious to those skilled in the art that it is not so limited, but is susceptible of various changes and modifications without departing from the spirit thereof, such as forming 22½ and 30 degree elbows or other fittings.

I claim:

1. The method of forming from sheet material of substantially rounded contour when viewed in plan a seamless pipe fitting having a plurality of pipe connecting portions which consists in drawing the sheet material to first form a blind pipe connecting portion and a flange portion, said flange portion being substantially U-shaped as viewed in plan or end elevation and having side edges sloping down at an angle from one end toward an opposite end, then drawing said flange portion from its U-shape to a circular shape as viewed in end elevation to form another pipe connecting portion, then finishing the ends of the pipe connecting portions.

2. The method of forming from sheet material of substantially rounded contour when viewed in plan a seamless pipe fitting having a plurality of pipe connecting portions which consists in drawing the sheet material to first form a blind pipe connecting portion and a flange portion, said flange portion being substantially U-shaped as viewed in plan or end elevation, the side walls of the U-shaped flange portion being spaced in substantially parallel alignment and at a distance substantially equal to the diameter of said blind pipe connecting portion and having their upper edges sloping downward at an angle from one end toward an opposite end, then drawing said flange portion including its side walls from its U-shape to a circular shape as viewed in end elevation to form another pipe connecting portion, then finishing the ends of the pipe connecting portions.

3. The method of forming from sheet material of substantially rounded periphery except for a flattened end portion a seamless elbow which consists in drawing the sheet material to first form a blind pipe connecting portion and a flange portion, said flange portion being substantially U-shaped as viewed in plan or end elevation, the end wall of the U-shaped flange portion being in alignment with and forming a continuation of the wall of said blind pipe connecting portion as viewed in plan and having its upper limits sloping downward at an angle from one end to an opposite end portion, drawing said flange portion from its U-shape to a circular shape as viewed in end elevation to form the other pipe connecting portion of the elbow, then finishing the ends of the pipe connecting portions.

4. The method of forming from sheet material of substantially rounded contour when viewed in plan a seamless pipe T having a run portion and a side outlet portion which consists in drawing the sheet material to first form a blind side outlet pipe connecting portion and a flange portion, said flange portion being substantially U-shaped as viewed in plan or end elevation, then drawing said flange portion from its U-shape to a circular shape as viewed in end elevation to form a run portion having a blind pipe connecting portion at one end thereof and an open pipe connecting portion at the other end, the flange portion before said latter drawing operation having its upper end surfaces sloping downward at an angle in a direction toward the open pipe connecting portion, then finishing the ends of the several pipe connecting portions.

5. The method of forming from sheet material of flat substantially rounded form a seamless pipe T having a run portion and a side outlet portion which consists in drawing the sheet material to first form a blind side outlet pipe connecting portion and a flange portion, said flange portion being substantially U-shaped as viewed in plan or end elevation, the side walls of the U-shaped flange portion being spaced in substantially parallel alignment and at a distance substantially equal to the diameter of said side outlet pipe connecting portion, then drawing said flange portion from its U-shape to a circular shape as viewed in end elevation to form a run portion having a blind pipe connecting portion at one end thereof and an open pipe connecting portion at the other end, the side walls before the latter drawing operation having their upper limits defined by surfaces sloping downward at an angle toward the open pipe connecting end portion, then finishing the ends of the several pipe connecting portions.

ALFRED MUELLER.